(12) United States Patent
Seiffert

(10) Patent No.: US 6,889,441 B2
(45) Date of Patent: May 10, 2005

(54) LASER ROLLER ALIGNMENT SYSTEM

(75) Inventor: Russell W. Seiffert, Garland, TX (US)

(73) Assignee: Seiffert Industrial Sales Company, Richardson, TX (US)

( * ) Notice: Subject to any disclaimer, the term of this patent is extended or adjusted under 35 U.S.C. 154(b) by 0 days.

(21) Appl. No.: 10/664,205

(22) Filed: Sep. 17, 2003

(65) Prior Publication Data

US 2005/0057743 A1 Mar. 17, 2005

(51) Int. Cl.[7] .......................... G01C 15/00; G01B 11/00
(52) U.S. Cl. ..................... 33/286; 33/DIG. 21; 356/399
(58) Field of Search ................................ 356/399–401, 356/614; 33/DIG. 21, DIG. 1, 281, 286, 228, 293

(56) References Cited

U.S. PATENT DOCUMENTS

| | | | |
|---|---|---|---|
| 4,249,294 A | * | 2/1981 | Belfiore ........................ 29/271 |
| 5,237,390 A | | 8/1993 | Chaney |
| 6,031,616 A | | 2/2000 | Seiffert |
| 6,098,297 A | * | 8/2000 | Belfiore ........................ 33/286 |
| 2003/0051354 A1 | * | 3/2003 | Segerstrom et al. ........... 33/286 |

* cited by examiner

Primary Examiner—Zandra V. Smith
Assistant Examiner—Gordon J. Stock, Jr.
(74) Attorney, Agent, or Firm—Howison & Arnott, L.L.P.

(57) ABSTRACT

A system for aligning a plurality of cylindrical rollers is disclosed. The system comprising a light emitter unit having a horizontal planar light source for generating a horizontal planar light signal and a vertical planar light source for generating a vertical planar light signal. The system further comprising a reflector unit having a reflective surface for receiving the vertical light signal from the light emitter unit and returning a reflected vertical light signal. A horizontal lineal indicator is provided on the exterior surface of the reflector unit and a vertical lineal indicator is provided on the exterior surface of the light emitter unit. By aligning the horizontal planar light signal with the horizontal lineal indicator and by aligning the reflected vertical light signal with the vertical lineal indicator, the cylindrical rollers are aligned in a common plane and are substantially parallel to each other.

7 Claims, 8 Drawing Sheets

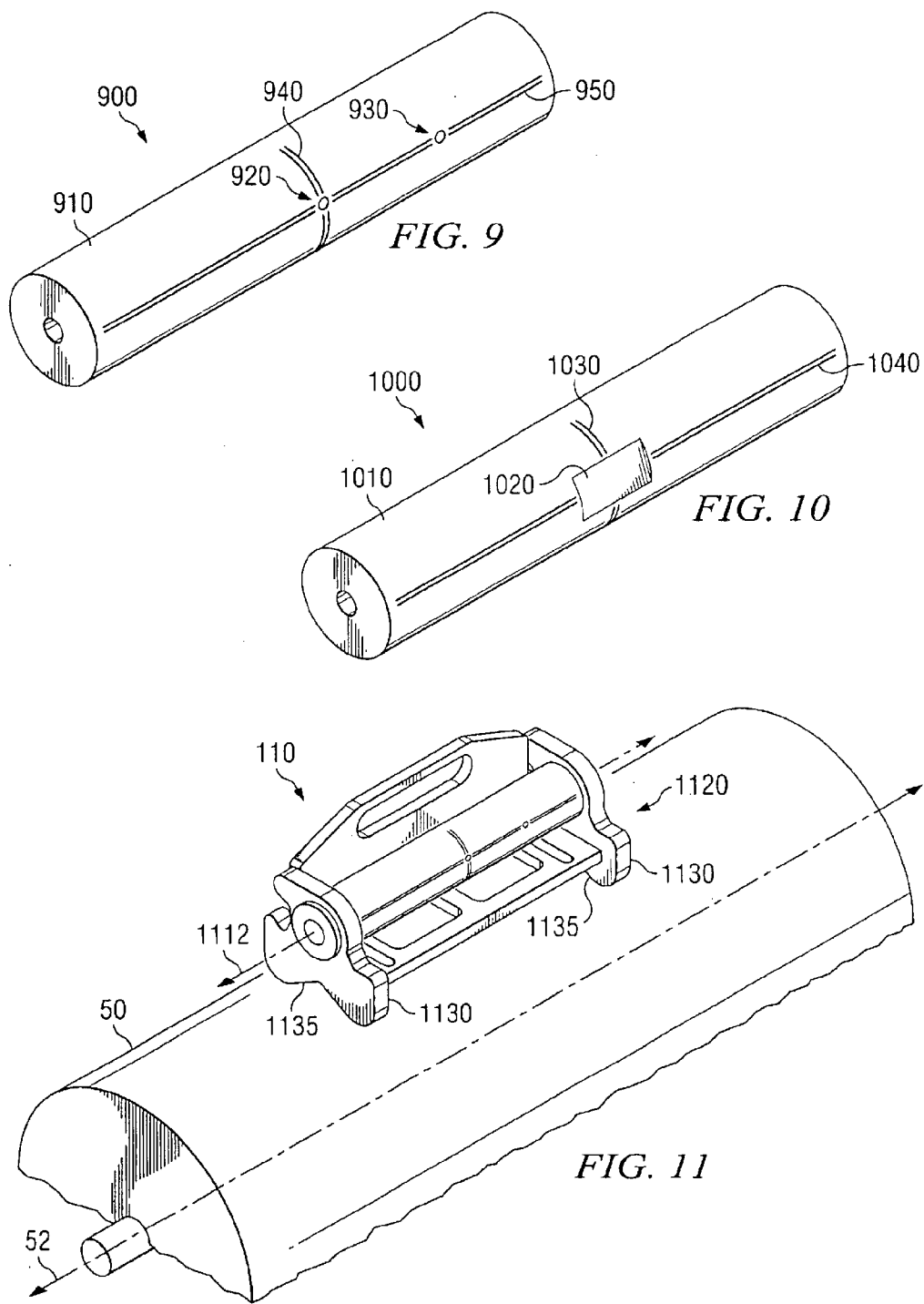

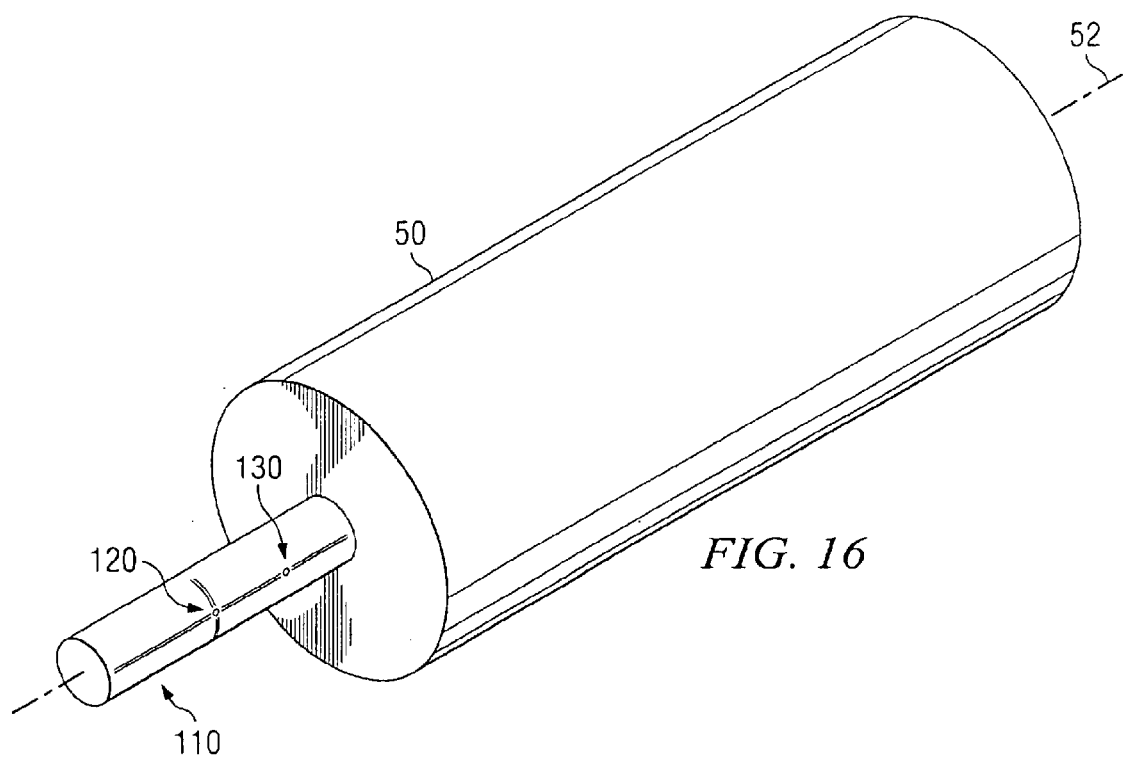

LASER ROLLER ALIGNMENT SYSTEM

CROSS-REFERENCE TO RELATED APPLICATIONS

This application is related to U.S. Pat. No. 6,031,616, issued Feb. 29, 2000, entitled "Laser Pulley Alignment System," incorporated in its entirety herein by specific reference thereto.

TECHNICAL FIELD OF THE INVENTION

The present invention relates generally to laser alignment systems and, in particular, to a laser alignment system for aligning large cylindrical rollers as used in paper production, paper printing, polymer film manufacturing, textile production, steel forming and metal foil processing.

BACKGROUND OF THE INVENTION

Prior art devices have attempted to provide systems for aligning large cylindrical rollers as used in the handling of paper, polymer film, fabric or metal foil. These devices attempt to provide an alignment such that one longitudinal axis is parallel to another for adjacent cylindrical rollers. Additionally, it would be desirable to align the rollers such that the exterior surfaces are tangential to a common plane. In this way, it is possible to reduce bending, twisting and wrinkling of the thin, film-like media as it is passed from one roller to another. A number of prior art devices have included visual indicators which operate by line of sight, such as straight edge rule indicators which are placed adjacent to the side surfaces of the rollers to visually inspect their respective alignment.

Generally, rollers are mechanically adjusted by an operator adding or removing thin metal shims to the shafts about which the rollers rotate. This is commonly done using mechanical measurements such as calipers or line of sight indicators such as rule indicators and proper alignment is generally achieved through a rather painstaking trial and error process. In making these adjustments, a significant amount of media such as paper, polymer film, or metal foil may be rendered as scrap until the rollers can be placed in proper alignment. Accordingly, there is a need for an alignment system which can ensure that the longitudinal axes of adjacent rollers are parallel to each other and that the surfaces of the rollers can be aligned along a common plane using a form of positive visual feedback which can significantly reduce the amount of trial and error adjustment and the associated scrap material.

SUMMARY OF THE INVENTION

A method and apparatus are provided for aligning first and second cylindrical roller members such that the respective longitudinal axes about which the first and second cylindrical roller members rotate will be substantially parallel and such that the exterior surfaces of the first and second cylindrical roller members may both tangentially contact a common plane passing from one surface to the other. The apparatus comprising a light emitter unit having a horizontal planar light source for generating a horizontal planar light signal and a vertical planar light source for generating a vertical planar light signal. The apparatus further comprising a reflector unit having a reflective surface for receiving the vertical light signal from the light emitter unit and returning a reflected vertical light signal. A horizontal lineal indicator is provided on the exterior surface of the reflector unit and a vertical lineal indicator is provided on the exterior surface of the light emitter unit. By aligning the horizontal planar light signal with the horizontal lineal indicator and by aligning the reflected vertical light signal with the vertical lineal indicator, the cylindrical rollers are aligned in a common plane and are substantially parallel to each other.

DESCRIPTION OF THE DRAWINGS

For a more complete understanding of the present invention and the advantages thereof, reference is now made to the following description taken in conjunction with the accompanying Drawings in which:

FIG. 9 illustrates a perspective view of a vertical and horizontal planar light source mounted in a housing featuring vertical and horizontal lineal indicators;

FIG. 10 illustrates a perspective view of a first surface reflector target mounted in a housing having vertical and horizontal lineal indicators;

FIG. 11 illustrates a simplified schematic diagram showing the mounting of a laser roller alignment component upon a roller to be aligned relative to other rollers;

FIG. 16 illustrates a perspective view of an alternative mounting for a light emitter unit on a large cylindrical roller.

DETAILED DESCRIPTION OF THE INVENTION

Figure 1:
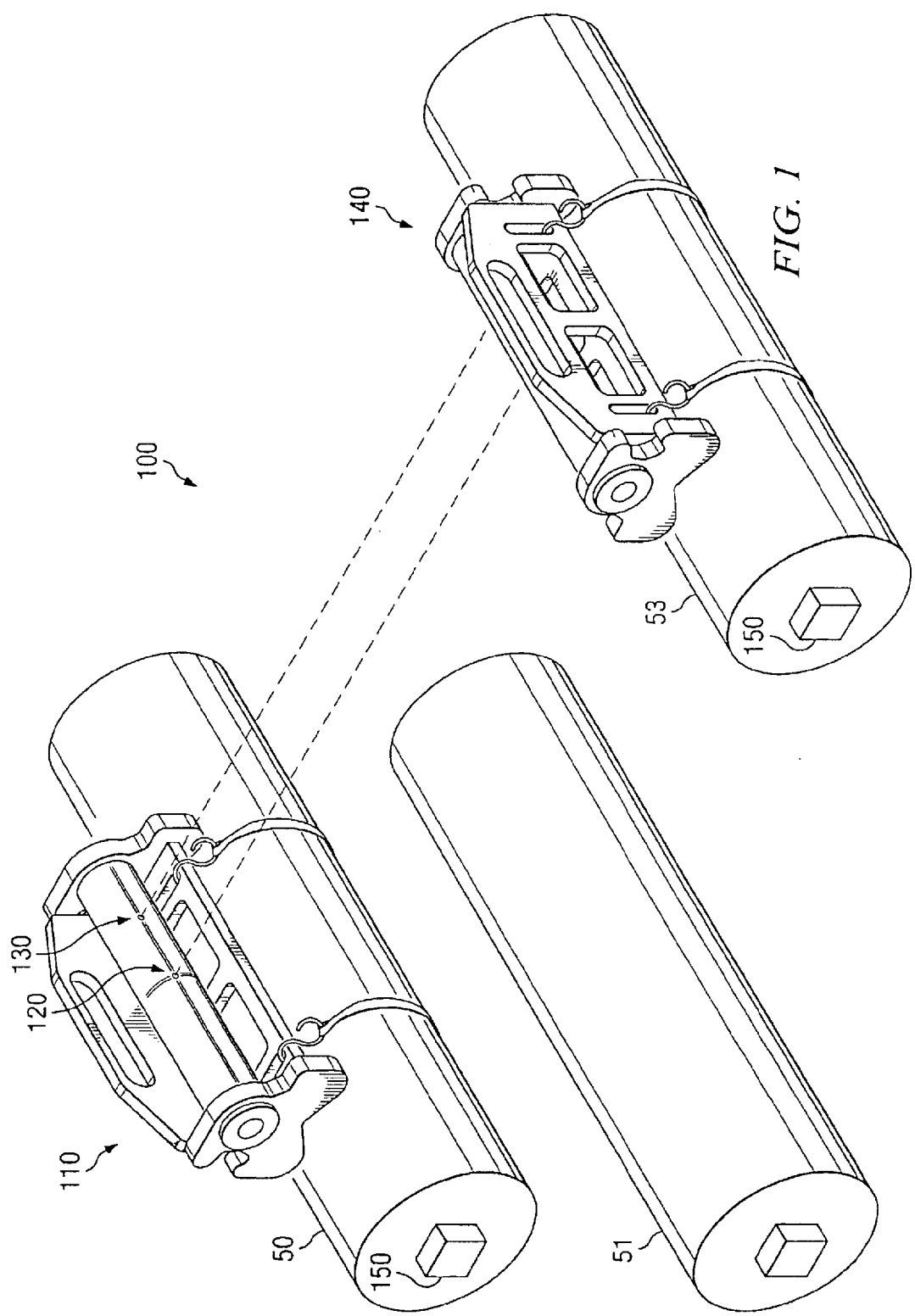
FIG. 1 illustrates a perspective view schematic diagram depicting the operation of a laser roller alignment system being used to align two rollers set a distance apart.

Referring now to FIG. 1, there is illustrated a perspective view schematic diagram depicting the operation of a laser roller alignment system for aligning large cylindrical rollers 50, 51 and 53 as used in paper production, paper printing, polymer film manufacturing, textile production, steel forming and metal foil processing. The laser roller alignment system 100 includes a light emitter unit 110 and a reflector unit 140. The light emitter unit 110 includes a first laser line generator 120 which emits a substantially vertical planar light signal, not shown, and a second laser line generator 130 which emits a substantially horizontal planar light signal, not shown. The planar light signals are preferably continuous beams of light which fan out to a length of about nine inches at about six feet from the face of the laser line generator 120, 130. The reflector unit 140 has a reflective surface associated therewith to reflect back an impinging light source to the light emitter unit 110. The exterior of the housing of the light emitter unit 110 and reflector unit 140 are provided with vertical and horizontal lineal indicator marks used for visual alignment purposes. The light emitter unit 110 and the reflector unit 140 are mounted on the large cylindrical rollers 50 and 53 respectively, to be aligned using a linked metal chain (resembling a bicycle chain), straps formed of a nylon webbing material, or other means for selectively mounting and removing the laser roller alignment system 100 to the exterior surface of the rollers 50, 51 and 53 to be aligned without damaging or scratching the surfaces.

The light emitter unit 110 should be positioned such that the vertical and horizontal planar light signals both strike the exterior surface of the reflector unit 140. By adding or removing thin metal shims, not shown, at the mounting 150 near the ends of the large metal rollers 50 and 53, it is possible to align the planar light sources 120, 130 with markings, not shown, on the exterior of the emitter unit 110 housing and reflector unit 140 housing. This will ensure that the first and second rollers 50 and 53 are aligned with their longitudinal axes being parallel and the external surfaces being aligned tangentially on a common plane. Using the laser roller alignment system 100 in this manner, it is possible to use positive visual feedback by aligning planar light sources with target indicators to align each roller 50 and 53 within a manufacturing or processing system. This system and method can significantly reduce the amount of trial and error required for aligning the large cylindrical rollers 50, 51 and 53 and significantly reduce the amount of scrap material generated whether it be paper, polymer film or metal foil.

Figure 2:
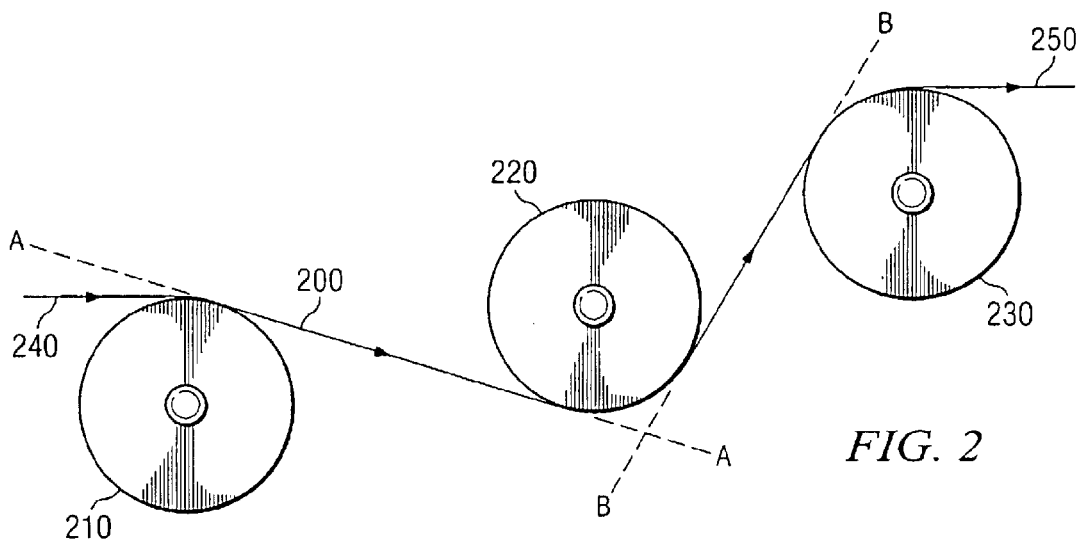
FIG. 2 illustrates a simplified side elevational view of a series of rollers with a series of arrows on a line indicating a possible paper path through the rollers.

Referring now to FIG. 2, a simplified side elevational view is shown with a lined path 200 having multiple arrow heads indicating a possible paper path through the series of rollers. For simplicity, the rest of the apparatus, including supports which hold the large cylindrical rollers and the motors which drive the rollers, has been omitted to better illustrate paper flow and alignment between tangential surfaces of the rollers along common planes. As shown here, the first roller 210 and the second roller 220 both preferably have exterior surfaces which may be aligned along a tangential plane A—A. Similarly, the second roller 220 and the third roller 230 have external surfaces which may be aligned along a tangential plane B—B. By properly aligning the rollers 210, 220, 230 it should be possible to pass a continuous sheet of paper along the path 200 from the supply point 240 to the take up point 250 without bunching, tearing or wrinkling the paper.

Figure 3:
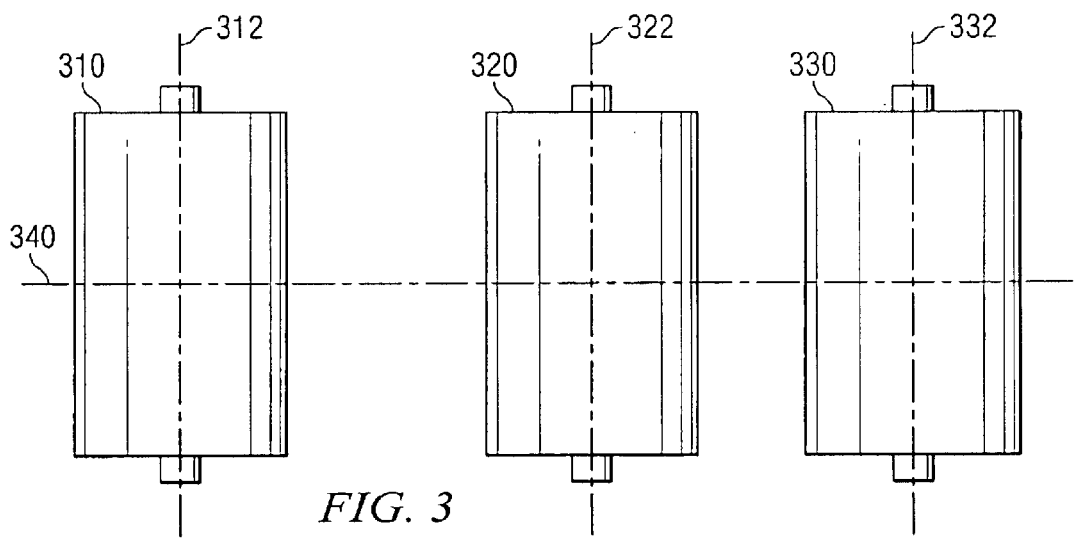
FIG. 3 illustrates a simplified top plan view of the rollers shown in FIG. 2 and indicating proper alignment of the rollers to ensure that each of the longitudinal axes are parallel relative to each other.

Referring now to FIG. 3, a simplified top plan view is shown featuring three rollers, as depicted in FIG. 2. The rollers 310, 320, 330 are each shown having longitudinal axes passing through the center thereof 312, 322, 332, respectively. Additionally, a single plane 340 running perpendicular to each of these three axes 312, 322, 332 is shown passing through the middle of all three rollers 310, 320, 330. This single plane 340 is representative of the substantially vertical planar light signal which will be emitted by the light emitter unit 110 of the laser roller alignment system 100, as shown and described in FIG. 1. As best seen in FIG. 3, when all three rollers 310, 320 and 330 are properly aligned, the longitudinal axes thereof, 312, 322, 332 are aligned parallel relative to each other and each longitudinal axes forms a precise 90° angle perpendicular to the plane 340 representative of the vertical planar light signal.

Figure 4:
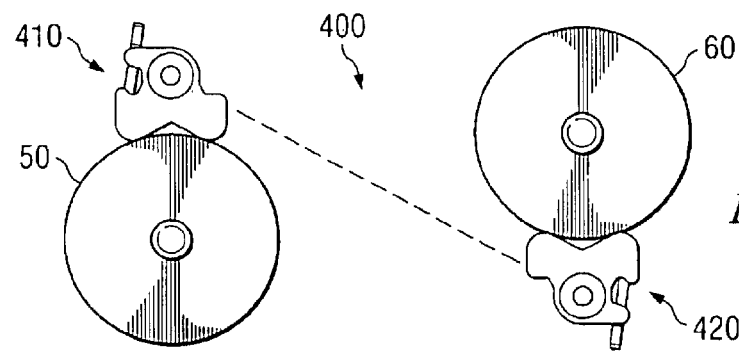
FIG. 4 is a simplified side elevational view showing two rollers being aligned into a common horizontal plane using the laser roller alignment system.

Referring now to FIG. 4, a simplified schematic illustrating a side elevational view of a laser roller alignment system positioned to align two large cylindrical rollers set some distance apart. The simplified laser roller alignment system 400 has a light emitter unit 410 and a reflector unit 420 attached to the first cylindrical roller 50 and the second cylindrical roller 60, respectively. As shown here, a substantially horizontal planar light source 430 may be transmitted from the emitter unit 410 to the reflector unit 420 and used to align the exterior surfaces of the first roller 50 and the second roller 60, as will be described hereinbelow, such that a common plane tangential to the surfaces may be defined. Moreover, by aligning the surfaces along a common tangential plane, it is possible to ensure that the longitudinal axes of each roller lie in a common horizontal plane.

Figure 5:
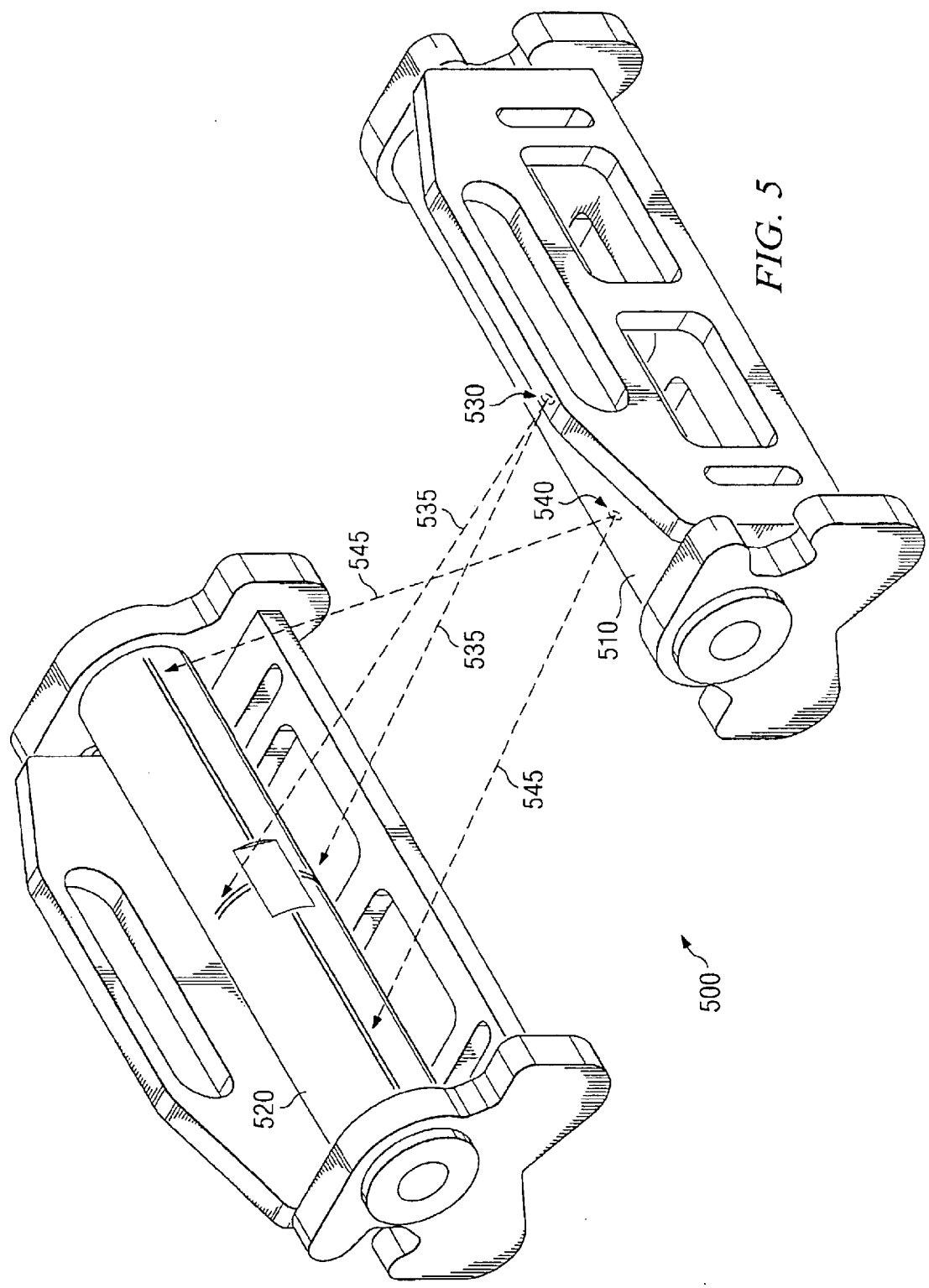
FIG. 5 illustrates a perspective view schematic diagram indicating a vertically planar light source and a horizontally planar light source striking the lineal indicators on the target housing.

Referring now to FIG. 5, a simplified perspective view schematic drawing illustrating a laser roller alignment system 500 is shown. The simplified laser roller alignment system 500 includes a light emitter unit 510 and a reflector unit 520 spaced some distance apart. The light emitter unit 510 is provided with a substantially vertical planar light source 530 and a substantially horizontal planar light source 540. As shown here, the substantially vertical planar light source 530 generates a vertical planar light signal 535 and forms a vertical line on the exterior surface of the reflector unit 520. Similarly, the substantially horizontal planar light source 540 emits a horizontal planar light signal 545 which forms a horizontal line on the exterior surface of the reflector unit 520.

As best seen in the simplified diagram of FIG. 5, the substantially vertical light source 530 is usually located on the surface of the light emitter unit 510 at a mid-point, substantially equidistant from both ends of the emitter unit 510. This is generally a desirable location for the vertical light source as it will usually be aligned or targeted with a reflector that is centrally located on the reflector unit for sending back a reflected or return signal, for reasons that will be discussed hereinbelow. The horizontal light source 540 may be slightly offset to the left or the right of the vertical light source 530 without affecting the operation of the laser roller alignment system 500. As will be explained in greater detail hereinbelow, it is usually not of any particular significance to have a reflected horizontal line indicator for purposes of aligning cylindrical rollers relative to each other.

In one embodiment, the vertical and horizontal light sources are preferably laser line generators of a type called a "laser diode, single line generator" which provides a planar light signal, such as that available from Power Technologies, Inc., of Little Rock, Ark., as Model No. RS2-635-5L8. The laser line generator will emit a planar light signal, which is a collimated light signal that is spread to extend perpendicular to the direction in which it travels. The collimated light signal is spread such that it expands within the plane of the light signal as it travels to define a line which is preferably of a length of nine inches at a distance of six feet from the face of the emitting face of the line generator.

Figure 6:
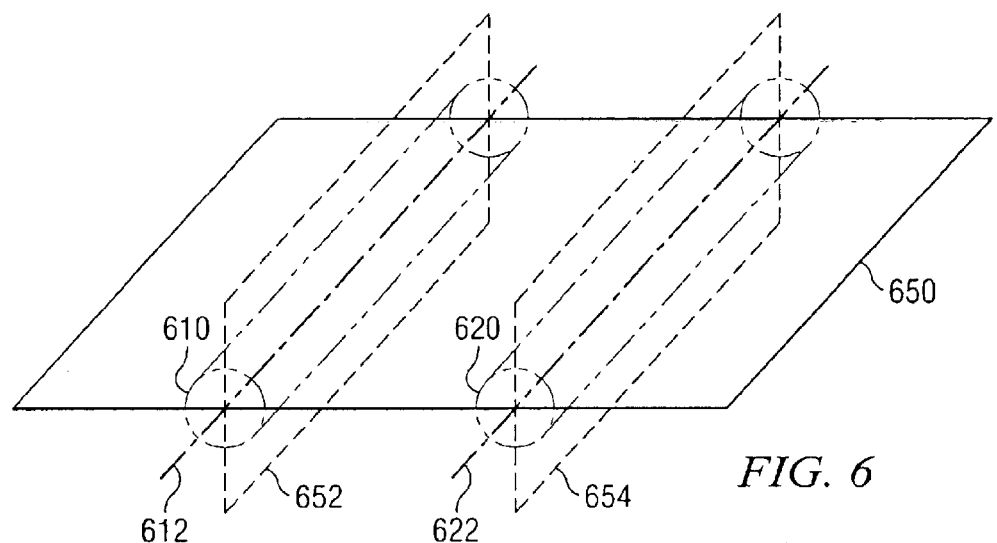
FIG. 6 shows a simplified perspective view of two rollers which have been aligned into a common horizontal plane.

Referring now to FIG. 6, there is illustrated a simplified schematic drawing showing a first roller 610 and a second roller 620 aligned in a single common plane 650. Additionally, there is provided a plane 652 associated with the first roller 610 and a plane 654 associated with the second roller 620, both of which are aligned perpendicular to common plane 650. As seen here, the single common plane 650 passes through the mid-point of both the first roller 610 and the second roller 620 and contains the lines representing the longitudinal axes 612, 622 of the first roller 610 and of the second roller 620, respectively. It should further be noted that a second plane, not shown, may be drawn to tangentially contact the exterior surfaces of both the first roller 610 and the second roller 620. Similarly, the plane 652 contains the longitudinal axis 612 of the first roller 610, and the plane 654 contains the longitudinal axis 622 of the second roller 620. When both rollers 610, 620 are aligned such that the longitudinal axes 612, 622 are parallel, both longitudinal axes will be in the common plane 650 and both perpendicular planes 652 and 654 will be parallel to each other.

Figure 7A:
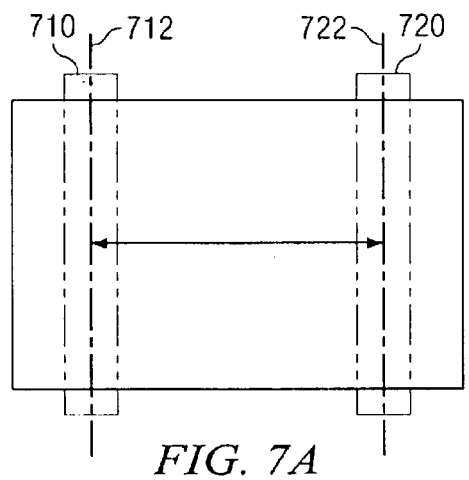
FIG. 7a shows a simplified top plan view of two rollers which have been properly aligned with the longitudinal axes being parallel relative to each other.
Figure 7B:
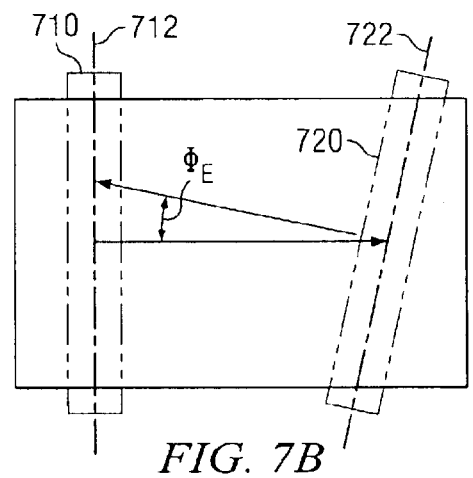
FIG. 7b is a simplified top plan view illustrating two rollers which are improperly aligned causing the longitudinal axes to be displaced at an angle relative to each other.

Referring now to FIGS. 7A and 7B, simplified top plan view drawings are used to illustrate proper alignment of a first and second roller to assure that the longitudinal axes are parallel relative to each other in the perpendicular plane. As best seen in FIG. 7A, when the first roller 710 and the second roller 720 are aligned such that the first longitudinal axis 712 and the second longitudinal axis 722 are substantially parallel, a light source reflected between the first roller 710 and the second roller 720 will travel precisely from the substantially vertical laser line generator to the mirror or other reflective surface of the reflector unit and the bounced or reflected light will return along substantially the same path to form a vertical line on the exterior of the housing of the light emitter unit, not shown.

Referring now in FIG. 7B, when the longitudinal axes of 712, 722 the first cylinder 710 and second cylinder 720 are not properly aligned, as shown here, the substantially vertical planar light signal may still strike the reflective surface mounted on the reflector unit and generate a bounced or return signal. However, in this instance, the vertical line generated by the return signal will be offset to either the right or left of the vertical planar light source of the light emitter unit. The amount of error shown in FIG. 7B is represented by the angle $\Phi_E$. As indicated here the angle $\Phi_E$ is directly proportional to the amount of angle formed by the offset between actual position of the longitudinal axis 722 of the second roll 720 and the intended position of the longitudinal axis 722 of the second roll 720 if it were made parallel to the longitudinal axis 712 of the first roll 710. Thus, by reducing the angle $\Phi_E$ to zero it is possible to properly align the vertical light signal generated by the emitter unit and then returned by the reflector unit. In this way, it is possible to rapidly assess, using positive visual indicators, the proper alignment of a first roll 710 and a second roll 720 to make their longitudinal axes 712 and 722 in the perpendicular planes associated therewith substantially parallel, relative to each other.

Figure 8A:
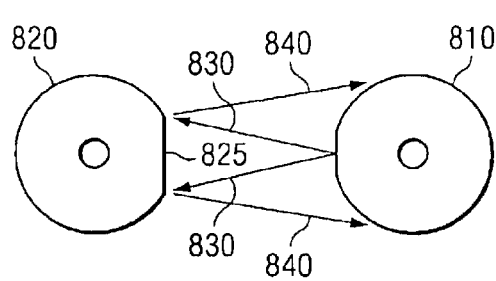
FIG. 8a illustrates a simplified side elevational view of a vertical planar light source being reflected off of a first surface reflector target and bounced back onto the exterior housing of the planer light source.
Figure 8B:
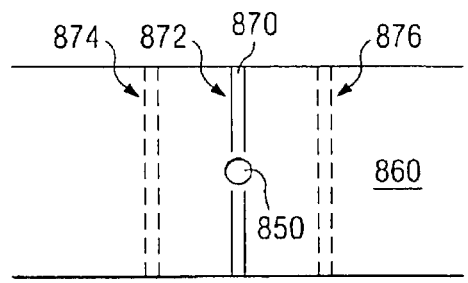
FIG. 8b illustrates a partial front elevational view depicting the vertical planar light source and a portion of the surrounding housing as well as reflected signals indicating proper or improper alignment of the rollers along the longitudinal axes.

Referring now to FIGS. 8A and 8B, the concept of incident and reflected vertical planes of light for use in providing positive visual feedback in aligning the longitudinal axes will be explained further. As best seen in FIG. 8A, a substantially vertical planar light source generates a plane of incident light traveling from the emitter unit 810 to the reflector unit 820. This incident plane of light is represented by the arrows forming a vertical plane of incident light 830. The incident light 830 strikes a reflective target 825 mounted on the surface of the reflector unit 820. The reflected light signal should form a vertical planar return signal represented by the arrows 840. This return signal 840 should strike the exterior surface of the emitter unit 810 forming a vertical line on the surface thereof.

Referring now to FIG. 8B, a simplified front elevational diagram is shown indicating a substantially vertical planar light source 850 and several possible vertical planar return signals incident upon the surface of the housing 860. As shown in the center of FIG. 8B, there is a vertical lineal indicator 870 marked on the exterior of the housing 860. When the longitudinal axes of the two rollers being adjusted are properly aligned such that they are parallel to each other, the vertical planar light source should generate a reflected signal 872 which is aligned perfectly with the vertical lineal indicator 870 passing through the center of the light source 850. Still referring to FIG. 7B, if the longitudinal axes of the first and second rollers are not properly aligned, then the vertical planar reflected signal 874, 876 will be offset somewhat to the right or left of the light source 850. As noted earlier in regard to FIGS. 7A and 7B, it is possible to assure proper and precise alignment of the longitudinal axes by making both precisely perpendicular to a substantially vertical plane passing between them. In operation, it is possible to assure a parallel alignment of longitudinal axes by adjusting the rollers on which the laser roller alignment emitter and reflector units are mounted such that the return laser signal 872 is aligned precisely on the vertical lineal indicator 870 passing through the center of the light source 850. As the vertical return signal 872 is aligned with the vertical lineal indicator 870 on the emitter unit, the angle of offset or error as shown in FIG. 7B, represented by $\Phi_E$ will approach zero. Consequently, the angle of offset between the longitudinal axes of the first roller and the second roller will also approach zero and these will be aligned parallel relative to each other.

Referring now to FIG. 9, a perspective view of a light emitter unit is shown. The light emitter unit 900 features a housing 910 having a first planar light source 920, a second planar light source 930, a vertical lineal indicator 940 and a horizontal lineal indicator 950. The housing 910 may be formed of aluminum, steel or other suitable metal alloys to provide a strong and rigid mounting for the first and second light sources 920, 930. In one embodiment the housing 910 is substantially cylindrical in shape and may be formed from a cylindrical steel ingot which has been machined to remove significant portions of the material to create pockets such that the electronic components supporting the first and second light sources may be contained entirely therein. The cylindrical shape is preferred in that it allows the emitter unit to be mounted laterally and held at its ends in such a way that the emitter unit may be held securely within a bracket or other mounting apparatus and rotated about its longitudinal axis to make adjustments during use. The first planar light source 920 is mounted centrally in the housing 910 and disposed substantially equidistant from the end points. The first planar light source 920 should produce a substantially vertical plane of laser emissions and must be precisely aligned with the vertical lineal indicator 940 embossed or printed on the exterior surface of the housing 910. The second planar light source 930 emits a substantially horizontal laser emission and may be offset to the right or left of the first planar light source 920. The second planar light source 930 should be precisely aligned with the horizontal lineal indicator 950 embossed or printed on the exterior of the housing 910.

The housing 910 also features at least one access way on the rear of the housing, not shown, suitable for positioning an ON/OFF switch for the first and second light sources and also providing an access way to the electronics and power needed to support the first and second light sources. Power is usually supplied by a small battery pack inserted into the rear of the housing. In one embodiment the battery pack contains 4 AA batteries. The first and second light sources usually require about 3–5 volts and can be supported by the batteries for at least 25 hours.

Referring now to FIG. 10, a perspective view of a reflector unit is shown. The reflector unit 1000 has a housing 1010, a reflector 1020, a vertical lineal indicator 1030 and a horizontal lineal indicator 1040. As with the light emitter unit, set forth and described in FIG. 9, in one embodiment the housing 1010 may be substantially cylindrical in shape and may be formed of various metal alloys including steel or aluminum. Again, the cylindrical shape facilitates the mounting by the end points which also can be designed to permit rotation about the longitudinal axis for ease of use. Moreover, the housing 1010 should be of sufficient strength and rigidity to ensure that there is no flexing or distortion and that the reflector 1020 has a rigid and secure mounting. The reflector 1020 is preferably a first surface reflector. The first surface reflector is similar to a common mirror with the exception that the silver or other highly reflective metallic coating is disposed on a glass substrate and is then polished such that light striking the reflective surface does not need to first pass through the glass. This reduces distortion of the incident light source or the reflected image due to the refractive index or imperfections in the glass substrate. In short, the reflector is constructed such that incident light is reflected back from the first surface of the reflector rather than a surface as seen through a layer of glass or other translucent material.

Still referring to FIG. 10, the reflector 1020 is positioned and aligned to be centered on both the vertical lineal indicator 1030 and the horizontal lineal indicator 1040 printed or embossed upon the exterior surface of the housing 1010. As noted earlier, the reflector unit's 1000 primary role is to receive both the vertical and horizontal planar light signals from the emitter unit and to reflect back a vertical planar signal toward the emitter unit. The vertical planar light signal should be aligned with the lineal indicator 1030 on the exterior of the housing 1010 and transmitted back from the surface of the reflector 1020 in the direction of the emitter unit.

Referring now to both FIGS. 9 and 10, the incident vertical planar laser emission should be aligned with the vertical lineal indicator 1030 on the reflector housing 1010, and the reflected laser emission should be aligned with the vertical lineal indicator 940 on the emitter housing 920. In this way it is possible to ensure that the longitudinal axes of the light emitter unit and the reflector unit are aligned parallel to each other. Consequently, if the components of the laser roller alignment system are made parallel to each other the longitudinal axes of the rollers atop which they are mounted should also be made parallel relative to each other.

Referring now to FIG. 11 a simplified perspective view schematic diagram is used to illustrate the mounting of a component 110 of the laser roller alignment system on top of a section of a roller 50 to be aligned. Note that in this mounting configuration, the cylindrical light emitter unit or reflector unit is mounted laterally atop two portions of the mounting bracket 1120. As with the housing of the laser roller alignment components themselves, the mounting bracket 1120 should also be formed of particularly strong and rigid materials such as metal alloys including aluminum or steel. In one embodiment, the mounting bracket 1120 may be formed of aluminum that is then anodized to provide an exterior surface that is harder than steel and has an attractive black coloration. As shown here, the end pieces 1130 of the mounting bracket 1120 have a somewhat V-shaped notch 1135 centrally located on the lower portion thereof. In one preferred embodiment, this somewhat V-shaped notch 1135 defines an angle of about 125° which should allow the mounting brackets and hardware to accommodate rollers ranging in diameter from about one inch to about ten feet.

In use, the mounting bracket 1120 contacts the exterior surface of the roller 50 to which it is mounted at exactly four points. This four point contact method should allow the components 1110 of the laser roller alignment system to be mounted securely to the exterior surface of the roller 50 and should ensure that the longitudinal axes 1112 of the transversely mounted alignment components 1110 are precisely aligned parallel to the longitudinal axes 52 of the roller 50 on which they are mounted. As noted earlier, in this way, it is possible to align the longitudinal axes of two rollers spaced some distance apart by aligning the longitudinal axes of the laser roller alignment system components, namely the light emitter unit and the reflector unit.

Figure 12:
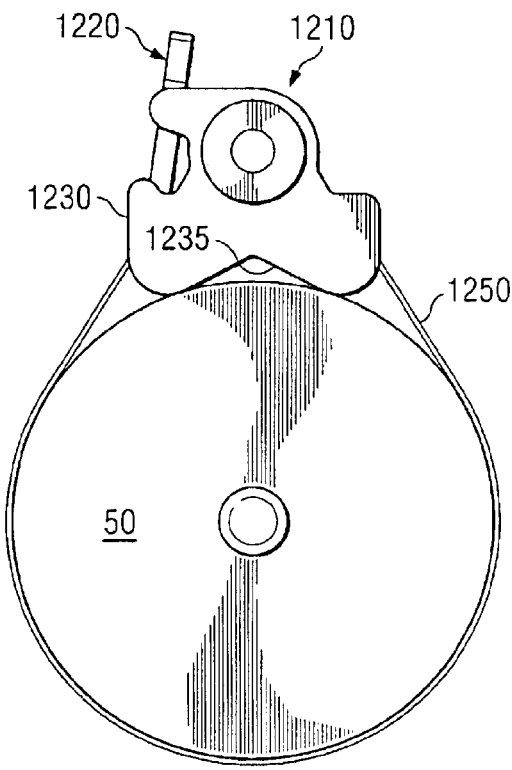
FIG. 12 is a side elevational view of a laser roller alignment component mounted on top of a roller to be aligned relative to the other rollers.

Referring now to FIG. 12 a simplified side elevational view of a laser roller alignment system component 1210 mounted on top of a roller 50 is shown. In this view, it is again possible to note the V-like notch 1235 on the lower portion of the mounting bracket end piece 1230 that is used to hold the cylindrical alignment component 1210 in place. The mounting bracket or hardware is held securely against the surface of the roller using either a linked metal chain or a strap formed of nylon webbing 1250. As shown here, the nylon webbing 1250 is securely attached to opposite sides of the mounting bracket 1220, wrapped completely about the exterior of the roller 50 to be aligned, and snugged up to ensure that there is no slippage between the alignment components 1210 and the roller 50.

Figure 13:
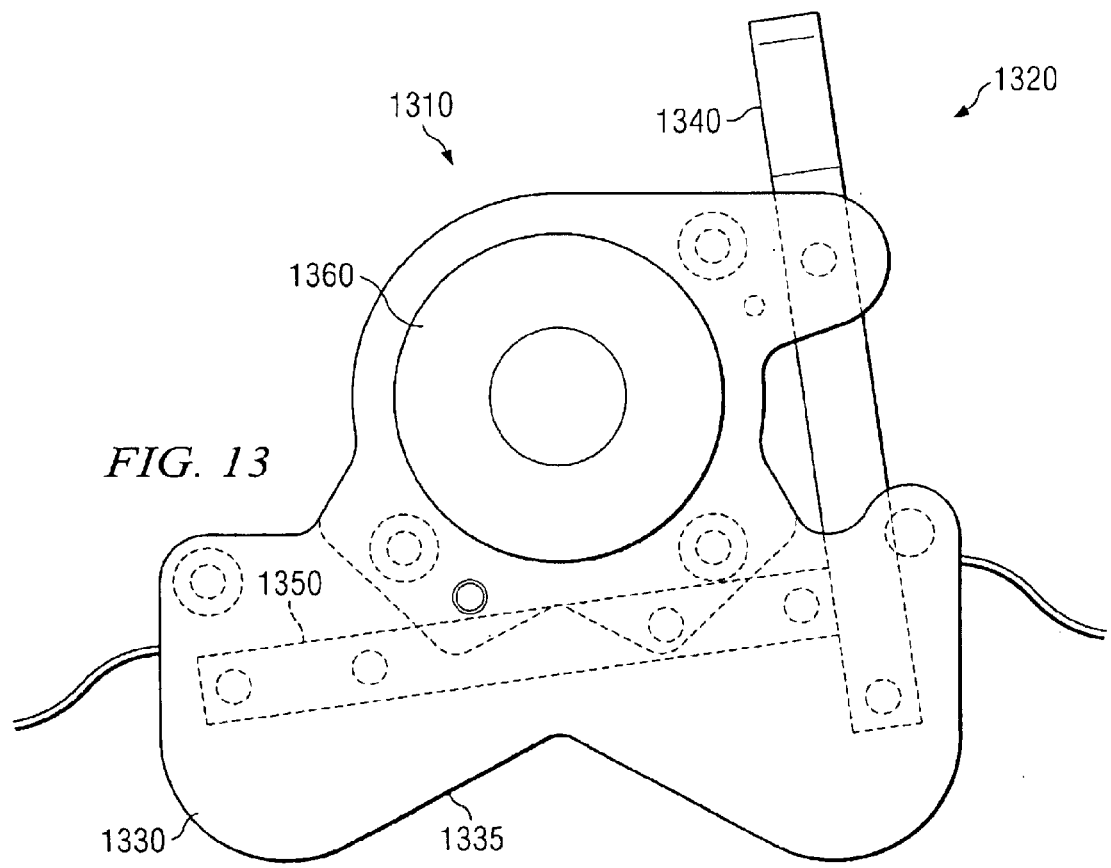
FIG. 13 is a side elevational view depicting a laser roller alignment component positioned in a mounting bracket featuring nylon webbing straps for attachment to a roller.

Referring now to FIG. 13, a detailed side elevational view of the mounting bracket 1320 holding an alignment component 1310 in place is shown. The mounting bracket 1320 comprises an end piece 1330 having a V-shaped lower portion 1335 for contacting the exterior surface of the roller, not shown. As noted earlier, one embodiment of this V-shaped base portion 1335 should define an angle of about 125°. The mounting bracket 1320 also has a rear plate usually provided with a handle, not shown, for lifting, carrying and positioning the roller alignment component 1310. The mounting bracket 1320 also has a bottom plate 1350 which is generally perpendicular to the back plate 1340 and which serves to further strengthen and stiffen the entire mounting bracket 1320 to assure that the two end pieces 1330 are held securely in place and that the laterally mounted laser roller alignment component 1310 is held securely in place and cannot move relative to the mounting bracket 1320 except for rotationally about its longitudinal axis.

The mounting bracket 1320 may further have additional reinforcement or support struts or crossbars, not shown, to provide additional stiffness and stability to the mounting bracket. As shown here, the laser roller alignment component 1310 is seen end on as held in the mounting bracket 1320. In this view, it is possible to see an adjustment knob 1360 which may be grasped at either end of the alignment component 1310 and used to rotate the alignment component relative to the mounting bracket 1320. This rotational motion is made possible by a set of high precision bearings which further assure that the alignment component 1310 is free to only move rotationally about its longitudinal axis. In one embodiment, the precision bearings may be R-series sealed ball bearings. A pair of spring-type of wave washers may also be used to assure a secure fit between the alignment component 1310 and the bearings housed in the end pieces 1330 of the mounting bracket 1320. A particularly stable mounting bracket as well as the high precision bearings are of significance to this particular invention as even slight inaccuracies in the lateral positioning of the alignment component may be multiplied and magnified going across the distance between the rollers being adjusted.

Figure 14:
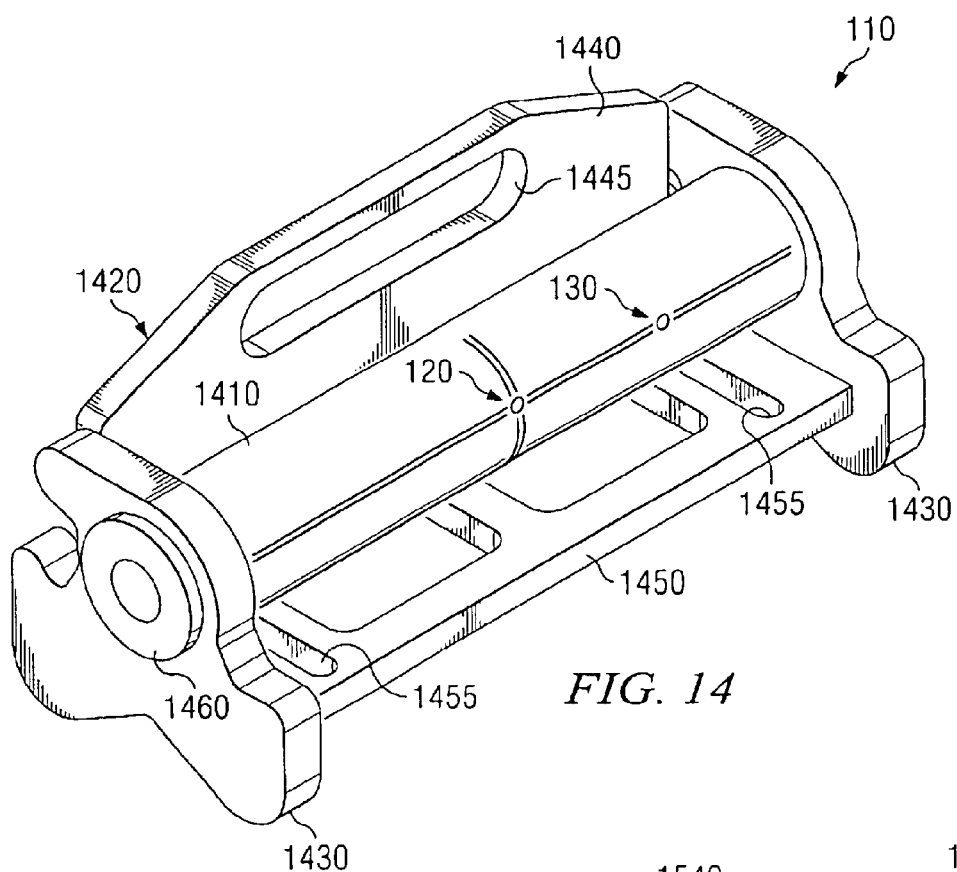
FIG. 14 illustrates a laser roller alignment light emitter unit completely assembled with one embodiment of a mounting bracket.
Figure 15:
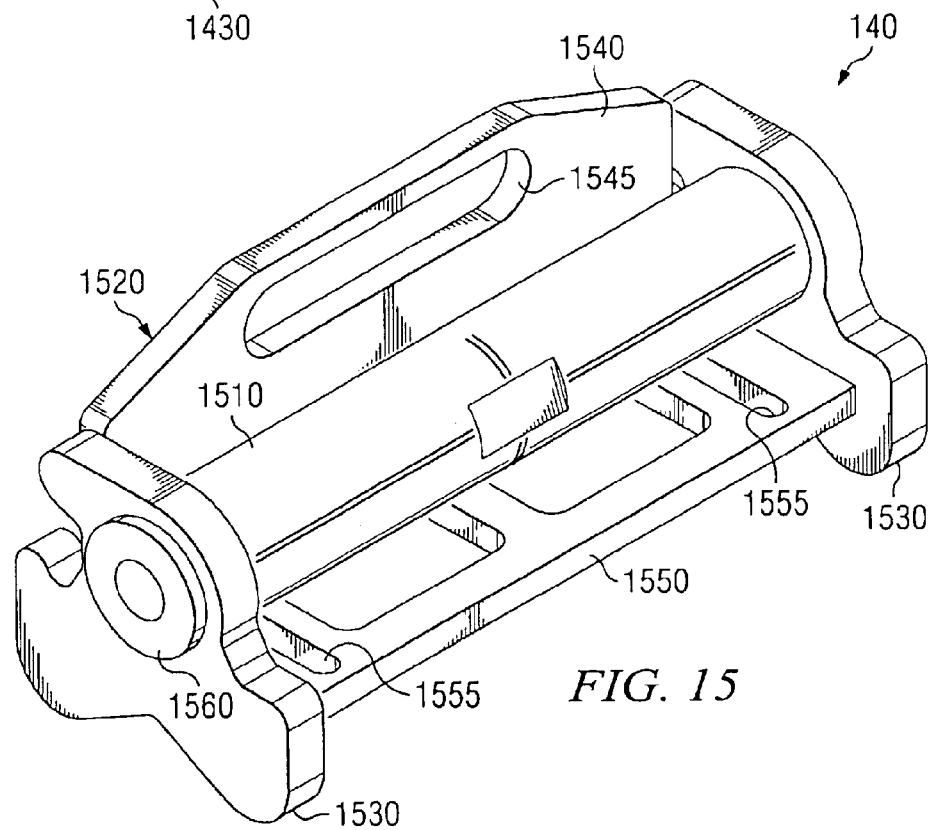
FIG. 15 illustrates a laser roller alignment reflector unit completely assembled in one embodiment of a mounting bracket.

Referring now to FIGS. 14 and 15, laser roller alignment system components including a light emitter unit 110 and a reflector unit 140 are shown. As indicated, each laser roller alignment component 1410, 1510 shown here is fully assembled and held securely within a mounting bracket 1420, 1520 of the type previously set forth and described in FIGS. 11 through 13. As best seen in FIGS. 14 and 15, the mounting bracket 1420, 1520 has two end pieces 1430, 1530 for holding a laterally mounted laser roller alignment component 1410, 1510. The laser roller alignment component 1410, 1510 is mounted on a pair of precision bearings, not shown, which are fitted into the end pieces 1430, 1530. The end pieces 1430, 1530 are held in place and the mounting bracket 1420, 1520 is provided with additional strength and rigidity by the bottom plate 1450, 1550 and the back plate 1440, 1540 which are mounted generally perpendicular to each other and, optionally, by additional rods or cross braces extending between the two end pieces.

The back plate 1440, 1540 and the bottom plate 1450, 1550 may be constructed of aluminum, steel or some other suitable rigid metal alloy and will usually have a number of openings extending there through to make the bracket both more functional and lighter in weight. One such opening, is the handle 1445, 1545 which is usually provided in the back plate 1440, 1540 of the mounting bracket 1420, 1520 which may be used to lift, carry and position the laser roller alignment components. Additionally, the front edge of the bottom plate 1450, 1550 may also be provided with a pair of openings 1445, 1555 near both the front and back edges of the plate through which a pair of nylon webbing straps or other roller attachment means may be hooked to the mounting bracket and then tightened to secure the laser roller alignment component in place on the surface of the roller. As shown in FIGS. 14 and 15, the laser roller alignment components are provided with a circular knob 1460, 1560 at either end of the assembly which a user may grasp to rotate the laser roller alignment component 1410 on the light emitter 1400 or the laser roller alignment component 1510 on the reflector unit about their longitudinal axes when in use.

Referring now to FIG. 16, by way of example only, one alternative embodiment for mounting a light emitter unit to a large cylindrical roller is shown. Although it is believed that a lateral mounting of roller alignment components along the surface of the roller is convenient, one alternative mounting is the axial attachment of the light emitter unit 110 to the end of the roller 50. In this mounting, the longitudinal axes of both the light emitter unit 110 and the roller 50 lie along the same line 52. It would still be possible to align a first roller 50 with a second roller, not shown, by aligning the light emitter unit 110 and a similarly mounted reflector unit, not shown.

Referring now to FIGS. 1, 14 and 15, a method of aligning two large cylindrical rollers set a distance apart will now be briefly described. The laser roller alignment components, as shown in FIGS. 14 and 15, may be set up for use as shown and described in regard to FIG. 1. The light emitter unit 110 is secured to a first cylindrical roller 50. The reflector unit 140 is secured to a second cylindrical roller 50. The light emitter unit 110 is switched ON to provide power to the two planar light sources 120, 130. An operator aligns the horizontal light source 130 with the horizontal lineal indicator of the reflector unit 140 to ensure that the rollers 50 are in a common plane. Next, the vertical light source 120 is positioned to reflect a return signal from the reflector unit 140. The returned vertical signal is then aligned with the vertical lineal indicator on the light emitter unit 110 to ensure that the rollers 50 are positioned parallel relative to each other. Once the roller with the reflector unit 140 has been adjusted to bring both the horizontal light source 130 and the vertical light source 120 into alignment with the appropriate indicators, the operator may move the reflector unit 140 to another cylindrical roller 50 to be aligned. Alternatively, it is possible to use a plurality of reflector units 140 to align several rollers 50 rapidly by matching the roller with the light emitter unit 110 mounted thereon. If an operator has more than one reflector unit 140 in place, it is often desirable to simply rotate the light emitter unit 110 about its longitudinal axis to point at each reflector unit 140 in turn. After properly aligning all rollers, the operator may run a sheet of media, namely paper, polymer film, fabric or metal foil, on a path though the rollers 50 for processing.

Although the preferred embodiment has been described in detail, it should be understood that various changes, substitutions and alterations can be made therein without departing from the spirit and scope of the invention as defined by the appended claims.

What is claimed is:

1. A system for aligning at least first and second cylindrical rollers comprising:
   a light emitter having a horizontal planar light source for generating a horizontal planar light signal and a vertical planar light source for generating a vertical planar light signal;
   a reflector unit having a reflective surface for receiving the vertical light signal from the light emitter unit and returning a reflected vertical light signal;
   a horizontal lineal indicator on the exterior of the reflector unit;
   a vertical lineal indicator on the light emitter unit; and
   wherein by aligning the horizontal planar light signal with the horizontal lineal indicator and by aligning the reflected vertical light signal with the vertical lineal indicator, the longitudinal axes of the first and second cylindrical rollers are substantially parallel to each other.

2. The system of claim 1, wherein the light emitter unit and the reflector unit are both substantially cylindrical in shape.

3. The system of claim 2, wherein the light emitter unit and the reflector unit are each laterally disposed in a respective mounting bracket, said respective mounting brackets mounted on a respective one of said first and second cylindrical rollers.

4. The system of claim 3, wherein said respective mounting brackets each further comprises a lower portion for contacting the respective one of said first and second cylindrical rollers.

5. The system of claim 4, wherein the lower portion forms an angle of about 125°.

6. The system of claim 4, wherein said respective mounting brackets each further comprises at least two straps of nylon webbing or linked metal chains.

7. A method for aligning a plurality of cylindrical rollers comprising:

mounting a light emitter unit to the surface of a first cylindrical roller, the light emitter unit having a horizontal planar light source for generating a horizontal planar light signal and a vertical planar light source for generating a vertical planar light signal;

mounting a reflector unit to the surface of a second cylindrical roller, the reflector unit having a reflective surface for receiving the vertical light signal from the light emitter unit and returning a reflected vertical light signal;

activating the horizontal planar light source and the vertical planar light source;

adjusting the orientation of the second roller in the vertical plane to align the horizontal planar light signal with a horizontal lineal indicator on the exterior of the reflector unit;

adjusting the orientation of the second roller in the horizontal plane to align the reflected vertical light signal with a vertical lineal indicator on the light emitter unit; and wherein by aligning the horizontal planar light signal with the horizontal lineal indicator and by aligning the reflected vertical light signal with the vertical lineal indicator, the longitudinal axes of the first and second cylindrical rollers are substantially parallel to each other.

* * * * *